US012785942B2

(12) United States Patent
Passelegue et al.

(10) Patent No.: US 12,785,942 B2
(45) Date of Patent: Nov. 3, 2026

(54) METHOD FOR PROCESSING HOMOMORPHIC CIPHERTEXT AND ELECTRONIC APPARATUS

(71) Applicant: CRYPTO LAB INC., Seoul (KR)

(72) Inventors: Alain Passelegue, Seoul (KR); Damien Stehle, Seoul (KR)

(73) Assignee: CRYPTO LAB INC., Seoul (KR)

( * ) Notice: Subject to any disclaimer, the term of this patent is extended or adjusted under 35 U.S.C. 154(b) by 0 days.

(21) Appl. No.: 19/217,240

(22) Filed: May 23, 2025

(65) Prior Publication Data

US 2025/0365138 A1 Nov. 27, 2025

(30) Foreign Application Priority Data

May 24, 2024 (KR) ........................ 10-2024-0067574
May 19, 2025 (KR) ........................ 10-2025-0064354

(51) Int. Cl.
*H04L 9/00* (2022.01)
*H04L 9/08* (2006.01)

(52) U.S. Cl.
CPC ............ *H04L 9/0825* (2013.01); *H04L 9/008* (2013.01); *H04L 9/085* (2013.01)

(58) Field of Classification Search
None
See application file for complete search history.

(56) References Cited

U.S. PATENT DOCUMENTS

2021/0359846 A1* 11/2021 Wright ................ G06F 16/2237
2021/0399874 A1* 12/2021 Polyakov ................ H04L 9/085
2023/0102012 A1* 3/2023 Miranda ............... H04L 9/3093
713/164

* cited by examiner

*Primary Examiner* — Nelson S. Giddins
(74) *Attorney, Agent, or Firm* — Steinfl + Bruno LLP

(57) ABSTRACT

Obtaining, by apparatuses in a system, a first public key for the apparatuses by using a threshold public key encryption scheme, and obtaining, by each of the apparatuses, a secret key share corresponding to each apparatus; generating, a second public key and a private key based on a non-threshold fully homomorphic encryption scheme, and providing the second public key to the server and the electronic apparatuses; generating a ciphertext by encrypting plaintext data using the second public key, then transmitting the ciphertext to the server; obtaining a homomorphic computation ciphertext by performing homomorphic computation on the received ciphertext using a circuit for combining threshold public key encryption; transmitting the ciphertext to the transcryptor; decrypting the homomorphic computation ciphertext using the private key, and broadcasting the decrypted ciphertext to the apparatuses; and performing partial decryption on the ciphertext using the secret key shares and by combining the partial decryption results.

11 Claims, 8 Drawing Sheets

FIG. 5

- Setup:
  1. Parties $P_1, \ldots, P_N$ run the threshold PKE key generation protocol to compute $(\mathsf{tpk}, \mathsf{tsk}_1, \ldots, \mathsf{tsk}_N) \leftarrow \mathsf{ThKeyGen}(1^\lambda)$ so that $P_i$ gets $(\mathsf{tpk}, \mathsf{tsk}_i)$ for $i \in [N]$;
  2. The transcryptor generates $(\mathsf{fpk}, \mathsf{fsk}) \leftarrow \mathsf{FhKeyGen}(1^\lambda)$ and broadcasts $\mathsf{fpk}$ to the server and all parties. It keeps $\mathsf{fsk}$ for itself.
- Encrypt data to the server:
  1. To send a data $\mu_i$ to the server, a user $P_i$ computes $\mathsf{fhct}_i \leftarrow \mathsf{FhEnc}_{\mathsf{fpk}}(\mu_i)$ and sends it to the server.
- Evaluation of $\mathsf{C}$ over encrypted data: To compute a circuit $\mathsf{C}$ on data $\mu_1, \ldots, \mu_\ell$ encrypted by users, the server evaluates $\mathsf{ThEnc}_{\mathsf{tpk}} \circ \mathsf{C}$ homomorphically on ciphertexts $\mathsf{fhct}_i$'s received from the users, where $\mathsf{fhct}_i := \mathsf{FhEnc}_{\mathsf{fpk}}(\mu_i)$ for $i \in [\ell]$. The result is a ciphertext $\mathsf{fhct}_{\mathsf{res}} \leftarrow \mathsf{FhEval}(\mathsf{ThEnc}_{\mathsf{tpk}} \circ \mathsf{C}, \mathsf{fhct}_1, \ldots, \mathsf{fhct}_\ell)$ which decrypts to $\mathsf{ThEnc}_{\mathsf{tpk}}(\mathsf{C}(\mu_1, \ldots, \mu_\ell))$.
- Decryption:
  1. The server sends $\mathsf{fhct}_{\mathsf{res}}$ to the transcryptor;
  2. The transcryptor decrypts it using $\mathsf{fsk}$ to recover a TPKE ciphertext $\mathsf{tct}_{\mathsf{res}} = \mathsf{ThEnc}_{\mathsf{tpk}}(\mathsf{C}(\mu_1, \ldots, \mu_\ell))$;
  3. The transcryptor broadcasts $\mathsf{tct}_{\mathsf{res}}$ to all parties;
  4. Party $P_i$ computes and broadcasts $\mathsf{p}_i \leftarrow \mathsf{ThPartDec}(\mathsf{sk}_i, \mathsf{tct}_{\mathsf{res}})$;
  5. Parties combine partial decryptions to recover the result as $\mathsf{ThFinDec}((\mathsf{p}_i)_{i \in [N]})$.

FIG. 7

▶ $\mathsf{KeyGen}(1^\lambda, 1^N)$:

1: Construct $Q = p \cdot q_{\mathsf{dec}}$ with $q_{\mathsf{dec}} \ll Q$ and the secret key dimension $n$
2: Sample $(\mathsf{sk}, \mathsf{pk}) \leftarrow \mathsf{FHE.KeyGen}(1^\lambda)$ with modulus $Q$
3: Define public parameters $\mathsf{pp}$ containing $Q, p, q_{\mathsf{dec}}$ as well as $\|\mathsf{sk}\|$
4: Sample $(\mathsf{sk}_1, \ldots, \mathsf{sk}_N) \leftarrow \mathsf{Share}(\mathsf{sk}, N, q_{\mathsf{dec}})$
5: Return $(\mathsf{sk}_1, \ldots, \mathsf{sk}_N, \mathsf{pk}, \mathsf{pp})$

FIG. 8

▶ $\mathsf{ServerDec}(\mathsf{pk}, \mathsf{ct})$:

$\mathsf{ct}_{\mathsf{fresh}} \leftarrow \mathsf{Enc}_{\mathsf{pk}}(0)$
$\mathsf{ct}_{\mathsf{in}} \leftarrow \mathsf{ct} + \mathsf{ct}_{\mathsf{fresh}}$
$\mathfrak{E} \leftarrow \mathcal{D}_{\sigma_{\mathsf{flood}}}$
Parse $\mathsf{ct}_{\mathsf{in}}$ as $(\mathsf{ct}_{\mathsf{in},0}, \mathsf{ct}_{\mathsf{in},1}) \bmod Q$
$\mathsf{ct}_{\mathsf{in},1} \leftarrow \mathsf{ct}_{\mathsf{in},1} + \mathfrak{E}$
$\mathsf{ct}_{\mathsf{dec},0} := \left\lfloor \frac{1}{p} \cdot \mathsf{ct}_{\mathsf{in},0} \right\rceil_{\sigma_0} \bmod q_{\mathsf{dec}}$
$\mathsf{ct}_{\mathsf{dec},1} := \left\lfloor \frac{1}{p} \cdot \mathsf{ct}_{\mathsf{in},1} \right\rceil_{\sigma_1} \bmod q_{\mathsf{dec}}$
$\mathsf{ct}_{\mathsf{dec}} := (\mathsf{ct}_{\mathsf{dec},0}, \mathsf{ct}_{\mathsf{dec},1})$
Return $\mathsf{ct}_{\mathsf{dec}}$ ▶ $\mathsf{PartDec}(\mathsf{sk}_i, \mathsf{ct}_{\mathsf{dec}})$:

Parse $\mathsf{ct}_{\mathsf{dec}}$ as $(\mathsf{ct}_{\mathsf{dec},0}, \mathsf{ct}_{\mathsf{dec},1})$
Sample $\mathfrak{d}_i \leftarrow \mathcal{D}_{\mathbb{Z},\eta}$
$\mathsf{p}_i \leftarrow \mathsf{ct}_{\mathsf{dec},0} \cdot \mathsf{sk}_i + \mathfrak{d}_i \bmod q_{\mathsf{dec}}$
Return $\mathsf{p}_i$ ▶ $\mathsf{FinDec}(\mathsf{ct}_{\mathsf{dec}}, \{\mathsf{p}_i\}_{i\in[N]})$:

Parse $\mathsf{ct}_{\mathsf{dec}}$ as $(\mathsf{ct}_{\mathsf{dec},0}, \mathsf{ct}_{\mathsf{dec},1})$
$\mathsf{z} \leftarrow \sum_{i\in[N]} \mathsf{p}_i + \mathsf{ct}_{\mathsf{dec},1} \bmod q_{\mathsf{dec}}$
$\mu \leftarrow \mathsf{Decode}_{q_{\mathsf{dec}}}(\mathsf{z})$
Return $\mu$

METHOD FOR PROCESSING HOMOMORPHIC CIPHERTEXT AND ELECTRONIC APPARATUS

TECHNICAL FIELD

The present disclosure relates to a method for processing a homomorphic ciphertext and an electronic apparatus, and more particularly, to a method for processing a homomorphic ciphertext that may perform threshold fully homomorphic encryption (threshold FHE) in a multi-party environment, and an electronic apparatus.

BACKGROUND ART

As communication technology advances and electronic apparatuses become more widespread, continuous efforts are being made to ensure secure communication between the electronic apparatuses. Accordingly, encryption and decryption technologies are used in most communication environments.

If a message encrypted by the encryption technology is transmitted to the other party, the other party is required to perform decryption to use the message. In this case, the other party may waste resources and time in a process of decrypting encrypted data. In addition, the message may be easily leaked to a third party if the third party hacks the message while the other party temporarily decrypts the message for computation.

To address these issues, homomorphic encryption methods are being studied. Homomorphic encryption may obtain the same result as an encrypted value obtained after performing a computation on a plaintext, even if the computation is performed on a ciphertext itself obtained without decrypting encrypted information. Therefore, various computations may be performed without decrypting the ciphertext.

Meanwhile, fully homomorphic encryption (FHE) may allow an arbitrary computation to be performed on the encrypted data. The FHE may have various applications in cryptography, and a representative example thereof is to privately delegate computations requiring a large amount of computations to a server. That is, if data is encrypted and transmitted to the server, the server does not know information on original data although a homomorphic computation is performed on the data in an encrypted state and a result is returned in an encrypted form. A data owner holding a decryption key of the fully homomorphic encryption (FHE) may decrypt a resultant ciphertext to thus obtain the plaintext of a computation result.

One of the most interesting recent developments in the fully homomorphic encryption is threshold fully homomorphic encryption (threshold FHE). A threshold setting requires the decryption key to be split and then provided to N users and each user to partially decrypt the ciphertext by using a key share assigned to himself or herself. Results of these partial decryptions may then be coupled to recover the plaintext.

The threshold fully homomorphic encryption may be very useful for various applications such as multi-party computation (MPC), threshold encryption, and delegated calculation on personal data of a plurality of users. For example, if each user encrypts his or her data and uploads the same to the server, anyone may request the server to perform a computation on the data. However, all parties may be required to perform decryption jointly to obtain a computation result, and each party may therefore control which information is to be disclosed to other parties and have a possibility to refuse decryption for a specific calculation.

However, a conventional threshold fully homomorphic encryption method is required to add exponential noise to a partially decrypted value for security, and the larger a noise magnitude, the more inefficient it is in terms of communication volume.

DISCLOSURE OF INVENTION

Solution to Problem

According to an embodiment of the present disclosure, provided is a control method of a system including a plurality of electronic apparatuses, a transcryptor, and a server, the method including: obtaining, by the apparatuses included in the system, a first public key for the apparatuses included in the system by using a threshold public key encryption scheme, and obtaining, by each of the plurality of electronic apparatuses, a secret key share corresponding to each apparatus; generating, by the transcryptor, a second public key and a private key based on a non-threshold fully homomorphic encryption scheme, and providing the second public key to the server and the plurality of electronic apparatuses; generating a ciphertext, by each of the plurality of electronic apparatuses, by encrypting plaintext data using the second public key, and then transmitting the generated ciphertext to the server; obtaining, by the server, a homomorphic computation ciphertext by performing homomorphic computation on the received ciphertext using a circuit for combining threshold public key encryption; transmitting, by the server, the homomorphic computation ciphertext to the transcryptor; decrypting, by the transcryptor, the homomorphic computation ciphertext using the private key, and broadcasting the decrypted homomorphic computation ciphertext to the plurality of electronic apparatuses; and obtaining a final decryption result, by a qualified group of electronic apparatuses among the plurality of electronic apparatuses, by performing partial decryption on the homomorphic computation ciphertext using the secret key shares and by combining the partial decryption results.

The qualified group of electronic apparatuses may correspond to a subset of the threshold public key encryption scheme.

The transcryptor may be one of the plurality of electronic apparatuses or a third party.

Communication between the server and the plurality of electronic apparatuses or communication between the plurality of electronic apparatuses may be protected using end-to-end encryption.

The encryption performed by the electronic apparatus may be performed using an encryption (Enc) function of the non-threshold fully homomorphic encryption scheme.

According to an embodiment of the present disclosure, provided is a control method of a system including a plurality of electronic apparatuses and a server, the method including: obtaining, by the apparatuses included in the system, a public key, and obtaining, by each of the plurality of electronic apparatuses, a secret key share; encrypting, by each of the plurality of electronic apparatuses, plaintext data using the public key based on a fully homomorphic encryption scheme; obtaining, by the server, a homomorphic computation ciphertext by receiving the encrypted data and by performing homomorphic computation on the encrypted data; converting, by the server, the ciphertext into a format enabling partial decryption by adding a fresh encryption of zero and a first noise to the homomorphic computation ciphertext and by rounding the ciphertext to which the first noise is added; transmitting, by the server, the converted homomorphic computation ciphertext to the plurality of electronic apparatuses; generating, by each of the plurality of electronic apparatuses, a partial decryption result by performing the partial decryption using the secret key share corresponding to the electronic apparatus and by adding a second noise to the partial decryption result; and obtaining, by a qualified group of electronic apparatuses among the plurality of electronic apparatuses, final plaintext data by combining the partial decryption results.

In the converting, the ciphertext may be converted by rounding (rescaling) the ciphertext, to which the first noise is added, with respect to a modulus $q_{dec}$ having a first size.

The first noise may be random Gaussian noise, and each component in the ciphertext may be converted using Gaussian rounding with respect to the modulus having the first size.

The partial decryption results respectively generated by the plurality of electronic apparatuses may be all aggregated and combined with a portion of the ciphertext received from the server, and the final plaintext data may be restored from a combined result value.

According to an embodiment of the present disclosure, provided is a non-transitory computer-readable medium storing instructions for executing a control method of a system including a plurality of electronic apparatuses, a transcryptor, and a server, wherein the method includes: obtaining, by the apparatuses included in the system, a first public key for the apparatuses included in the system by using a threshold public key encryption scheme, and obtaining, by each of the plurality of electronic apparatuses, a secret key share corresponding to each apparatus; generating, by the transcryptor, a second public key and a private key based on a non-threshold fully homomorphic encryption scheme, and providing the second public key to the server and the plurality of electronic apparatuses; generating a ciphertext, by each of the plurality of electronic apparatuses, by encrypting plaintext data using the second public key, and then transmitting the generated ciphertext to the server; obtaining, by the server, a homomorphic computation ciphertext by performing homomorphic computation on the received ciphertext using a circuit for combining threshold public key encryption; transmitting, by the server, the homomorphic computation ciphertext to the transcryptor; decrypting, by the transcryptor, the homomorphic computation ciphertext using the private key, and broadcasting the decrypted homomorphic computation ciphertext to the plurality of electronic apparatuses; and obtaining a final decryption result, by a qualified group of electronic apparatuses among the plurality of electronic apparatuses, by performing partial decryption on the homomorphic computation ciphertext using the secret key shares and by combining the partial decryption results.

According to an embodiment of the present disclosure, provided is a non-transitory computer-readable medium storing instructions for executing a control method of a system including a plurality of electronic apparatuses and a server, wherein the method includes: obtaining, by the apparatuses included in the system, a public key, and obtaining, by each of the plurality of electronic apparatuses, a secret key share; encrypting, by each of the plurality of electronic apparatuses, plaintext data using the public key based on a fully homomorphic encryption scheme; obtaining, by the server, a homomorphic computation ciphertext by receiving the encrypted data and by performing homomorphic computation on the encrypted data; converting, by the server, the ciphertext into a format enabling partial decryption by adding a fresh encryption of zero and a first noise to the homomorphic computation ciphertext and by rounding the ciphertext to which the first noise is added; transmitting, by the server, the converted homomorphic computation ciphertext to the plurality of electronic apparatuses; generating, by each of the plurality of electronic apparatuses, a partial decryption result by performing the partial decryption using the secret key share corresponding to the electronic apparatus and by adding a second noise to the partial decryption result; and obtaining, by a qualified group of electronic apparatuses among the plurality of electronic apparatuses, final plaintext data by combining the partial decryption results.

BRIEF DESCRIPTION OF DRAWINGS

FIG. 5 is a diagram for describing a three-round protocol for a private threshold computation according to an embodiment of the present disclosure;

FIG. 7 is a diagram for describing key generation in a double flooding- and round-based threshold fully homomorphic encryption according to another embodiment of the present disclosure; and FIG. 8 is a diagram for describing a decryption procedure in the double flooding- and round-based threshold fully homomorphic encryption according to another embodiment of the present disclosure.

BEST MODE FOR THE INVENTION

Figure 1:
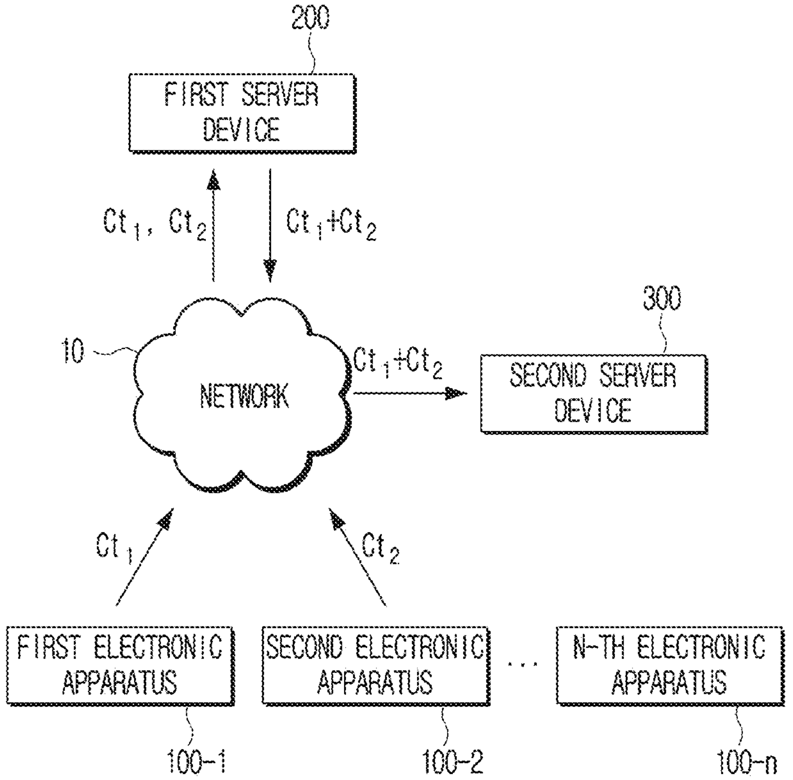
FIG. 1 is a diagram for describing a structure of a network system according to an embodiment of the present disclosure.

Hereinafter, the present disclosure is described in detail with reference to the accompanying drawings. Encryption/decryption may be applied as necessary to a process of transmitting information (or data) that is performed in the present disclosure, and an expression describing the process of transmitting the information (or data) in the present disclosure and the claims should be interpreted as including all cases of the encryption/decryption even if not separately mentioned. In the present disclosure, an expression such as "transmission (transfer) from A to B" or "reception from A to B" may include transmission (transfer) or reception while having another medium included in the middle, and may not necessarily express only the direct transmission (transfer) or reception from A to B.

In describing the present disclosure, a sequence of each step should be understood as non-restrictive unless a preceding step in the sequence of each step needs to logically and temporally precede a subsequent step. That is, except for the above exceptional case, the essence of the present disclosure is not affected even if a process described as the subsequent step is performed before a process described as the preceding step, and the scope of the present disclosure should also be defined regardless of the sequences of the steps. In addition, in this specification, "A or B" may be defined to indicate not only selectively indicating either A or B, but also including both A and B. In addition, a term "including" in the present disclosure may encompass a concept of further including other components in addition to components listed as being included.

The present disclosure only describes essential components necessary for describing the present disclosure, and does not mention components unrelated to the essence of the present disclosure. In addition, it should not be interpreted as an exclusive concept that the present disclosure includes only the mentioned components, and should be interpreted as a non-exclusive concept that the present disclosure may include other components as well.

In addition, in the present disclosure, a "value" may be defined as a concept that includes a vector as well as a scalar value. In addition, in the present disclosure, an expression such as "derive" or "calculate" may be replaced with an expression that generates a result of the corresponding derivation or calculation. In addition, unless otherwise indicated, a computation on a ciphertext described below refers to a homomorphic computation. For example, addition on homomorphic ciphertexts indicates homomorphic addition on two homomorphic ciphertexts.

Mathematical computations and derivation in each step of the present disclosure described below may be implemented as computer computations by a known coding method and/or coding designed to be appropriate for the present disclosure to perform the corresponding computations and derivations.

Specific expressions described below are illustratively provided among possible alternatives, and the scope of the present disclosure should not be construed as being limited to the expressions mentioned in the present disclosure.

For convenience of description, the present disclosure defines the following notations.

$a \leftarrow D$: Select an element a based on distribution D.

$s_1, s_2 \in R$: Each of $s_1$ and $s_2$ is an element belonging to a set R.

mod(q): Perform a modular computation with an element q.

$\lfloor \cdot \rceil$: Round an internal value.

Hereinafter, various embodiments of the present disclosure are described in detail with reference to the accompanying drawings.

FIG. 1 is a diagram for describing a structure of a network system according to an embodiment of the present disclosure.

Referring to FIG. 1, the network system may include a plurality of electronic apparatuses 100-1 to **100-*n*, a first server device 200, and a second server device 300, and the respective components may be connected to one another via a network 10**.

The network 10 may be implemented as any of various forms of wired/wireless communication networks, a broadcast communication network, an optical communication network, a cloud communication network or the like, and the respective apparatuses may be connected to one another without a separate medium, such as wireless fidelity (Wi-Fi), Bluetooth, or near field communication (NFC).

FIG. 1 shows that the plurality of electronic apparatuses 100-1 to **100-*n* are provided. However, the plurality of electronic apparatuses are not necessarily required to be used, and a single apparatus may be used instead. As an example, the electronic apparatuses 100-1 to 100-*n*** may be implemented in various forms of apparatuses such as smartphones, tablets, game players, personal computers (PCs), laptop PCs, home servers, or kiosks, and may also be implemented in the form of home appliances using Internet of Things (IoT) functions.

A user may input various information by using the electronic apparatuses 100-1 to **100-*n* that the user uses. The input information may be stored in the electronic apparatuses 100-1 to 100-*n* themselves, or may also be transmitted to and stored in an external device for reasons such as storage capacity and security. As shown in FIG. 1, the first server device 200 may serve to store such information, and the second server device 300 may serve to utilize some or all of the information stored in the first server device 200**.

Each of the electronic apparatuses 100-1 to **100-*n* may homomorphically encrypt the input information and transmit a homomorphic ciphertext to the first server device 200**.

Each of the electronic apparatuses 100-1 to **100-*n* may include an error, i.e., encryption noise derived in a process of performing homomorphic encryption, in the ciphertext. In detail, the homomorphic ciphertext generated by each of the electronic apparatuses 100-1 to 100-*n*** may be generated in a form in which a result value including a message and an error value is restored if the homomorphic ciphertext is decrypted later by using a secret key.

As an example, the homomorphic ciphertext generated by each of the electronic apparatuses 100-1 to **100-*n*** may be generated in a form that satisfies the following property if decrypted using the secret key.

$$Dec(ct, sk) = \langle ct, sk \rangle = M + e(\bmod q) \quad \text{[Equation 1]}$$

Here, < and > indicate dot product computation (or usual inner product), ct indicates the ciphertext, sk indicates the secret key, M indicates a plaintext message, e indicates the encryption error value, and mod q indicates a ciphertext modulus. q needs to be selected to be larger than a result value M multiplied by a scaling factor Δ to the message. If an absolute value of the error value e is sufficiently smaller than M, a decrypted value M+e of the ciphertext may be a value that may replace an original message by the same precision in a significant figure. Among decrypted data, the error may be disposed on the least significant bit (LSB) side, and M may be disposed on the next least significant bit side.

If a message size is too small or too large, the size may be adjusted using the scaling factor. If the scaling factor is used, not only a message in an integer form but also a message in a real number form may be encrypted, and its usability may thus be greatly increased. In addition, the message size may be adjusted using the scaling factor to thus also adjust a size of an effective region, that is, a region where the messages are present in the ciphertext after the computation is performed.

In some embodiments, the ciphertext modulus q may be set and used in various forms. As an example, the ciphertext modulus may be set in a form of an exponential power $q=\Delta^L$ of the scaling factor Δ. If Δ is 2, the modulus may be set to a value such as $q=2^{10}$.

In addition, the homomorphic ciphertext according to the present disclosure is described assuming that fixed point-numbers are used. However, the homomorphic ciphertext may also be applied even to a case where floating-point numbers are used.

The first server device 200 may store the received homomorphic ciphertext in a ciphertext state without decrypting the ciphertext.

The second server device 300 may request a specific processing result for the homomorphic ciphertext from the first server device 200. The first server device 200 may perform a specific computation based on the request from the second server device 300 and then transmit its result to the second server device 300.

As an example, if ciphertexts ct1 and ct2 transmitted from the two electronic apparatuses 100-1 and 100-2 are stored in the first server device 200, the second server device 300 may request the first server device 200 for a value obtained by combining information provided by the two electronic apparatuses 100-1 and 100-2. The first server device 200 may perform a computation for combining the two ciphertexts based on the request and then transmit a result value ct1+ct2 to the second server device 300.

Due to a property of the homomorphic ciphertext, the first server device 200 may perform the computation without decrypting the ciphertext, and the result value may also be generated in a ciphertext form. In the present disclosure, the result value obtained using the computation is referred to as a homomorphic computation ciphertext (or a computation result ciphertext).

The first server device 200 may transmit the computation result ciphertext to the second server device 300. The second server device 300 may decrypt the received computation result ciphertext to thus obtain the computation result value of data included in each homomorphic ciphertext.

Meanwhile, FIG. 1 shows a case where the encryption is performed by the first electronic apparatus and the second electronic apparatus, and the second server device performs the decryption, and the present disclosure is not necessarily limited thereto.

Meanwhile, the system according to an embodiment of the present disclosure may perform threshold fully homomorphic encryption (threshold FHE). The threshold fully homomorphic encryption (threshold FHE) refers to a concept for extending the fully homomorphic encryption (FHE) to a multi-client environment. A decryption key may be secret-shared among N parties, and a sufficient number of parties need to participate in a decryption protocol to decrypt the ciphertext. The parties may use their own secret key shares to execute a partial decryption algorithm (PartDec) on the ciphertext, and then combine of these partial decryption results to obtain the original message corresponding to the ciphertext (FinalDec).

The threshold fully homomorphic encryption may enhance security by allowing the computations to be performed by delegating private data owned by multiple parties to the server and eliminating a single point of failure by distributing the secret key.

However, as described above, the existing threshold fully homomorphic encryption requires excessive communication between the server and the electronic apparatus, or between the electronic apparatuses. Alternatively, although some existing methods require a small communication volume, the security of these methods is not proven in a realistic security model.

The present disclosure discloses two embodiments that require low communication costs to address the above-mentioned issues.

A first embodiment refers to an embodiment performed using a protocol based on a fully homomorphic encryption scheme and a threshold public key encryption scheme (threshold PKE). The threshold public key encryption scheme may have the same structure as the threshold fully homomorphic encryption without a homomorphic computation algorithm (e.g., homomorphic evaluation). In particular, this embodiment may further disclose a transcryptor that performs an additional round for the decryption. This embodiment is described below with reference to FIGS. 4 and 5.

A second embodiment refers to an embodiment performed using a protocol based on a threshold fully homomorphic encryption scheme having a small-sized partial decryption share. The protocol may be based on any fully homomorphic encryption scheme that satisfies (1) a property that the ciphertext is a vector-shaped ciphertext and (2) a property that decryption includes decoding the inner product between the ciphertext and the decryption key. In particular, this embodiment may be applied to learning with errors (LWE)-based, RingLWE (RLWE)-based, and ModuleLWE (MLWE)-based fully homomorphic encryption schemes (e.g., torus fully homomorphic encryption (TFHE), fully homomorphic encryption over the Web (FHEW), Brakerski-Fan-Vercauteren (BFV) scheme, Brakerski-Gentry-Vaikuntanathan (BGV) scheme, Cheon-Kim-Kim-Song (CKKS) scheme). This embodiment is described below with reference to FIGS. 6 to 8.

Figure 2:
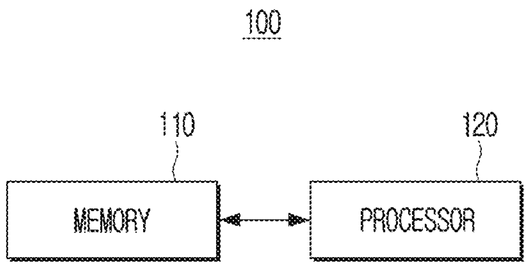
FIG. 2 is a block diagram showing a brief configuration of an electronic apparatus according to an embodiment of the present disclosure.

FIG. 2 is a block diagram showing a brief configuration of an electronic apparatus according to an embodiment of the present disclosure.

Referring to FIG. 2, an electronic apparatus 100 may include a memory 110 and a processor 120.

The memory 110 is a component for storing various instructions and/or software, data, or the like related to an operating system (O/S) for driving the electronic apparatus 100 or for the generation and computation processing of the homomorphic ciphertext described below. The memory 110 may be implemented in any of various forms such as a random-access memory (RAM), a read-only memory (ROM), a flash memory, a hard disk drive (HDD), an external memory, or a memory card, and is not limited to any one thereof.

The memory 110 may store a message to be encrypted. Here, the message may include various credit information, personal information, or the like quoted by the user, and may also be information related to a usage history, such as location information, internet usage time information, or the like used by the electronic apparatus 100. Alternatively, the message may be a spoken voice of the user or text resulting from text-to-speech (TTS) of the above-mentioned voice. Here, the message to be encrypted may be referred to as plaintext data.

In addition, the memory 110 may store a public key. If the electronic apparatus 100 is a device that directly generates the public key, the electronic apparatus 100 may store not only the secret key, but also various parameters required for generating the public key and the secret key.

In addition, the memory 110 may store a homomorphic ciphertext generated in a process described below (for example, a merged homomorphic ciphertext or a homomorphic ciphertext resulting from a homomorphic computation). Here, the ciphertext stored in the memory 110 may be a ciphertext generated using the LWE scheme, and is not limited thereto.

The processor 120 may control each component included in the electronic apparatus 100. The processor 120 may be configured as a single device such as a central processing unit (CPU) or an application-specific integrated circuit (ASIC), or may be configured as a plurality of devices such as central processing units (CPUs) and graphics processing units (GPUs).

The processor 120 may store the message to be transmitted in the memory 110 if the corresponding message is input thereinto. The processor 120 may homomorphically encrypt the message by using various set values and programs stored in the memory 110. In this case, the public key may be used.

The processor 120 may generate and use the public key required to perform the encryption on its own, or may receive the public key from the external device and use the same. As an example, the second server device 300 performing the decryption may distribute the public key to other devices.

If the processor 120 generates the key on its own, the processor 120 may generate the public key by using a Ring-LWE scheme. To describe in detail, the processor 120 may first set the various parameters and rings and store the same in the memory 110. An example of the parameter may include a length of plaintext message bits, a dimension n, a rank k, a size of the public key or the secret key, or the like. The homomorphic ciphertext may have various formats, and the processor 120 may set the ring based on a ciphertext scheme selected according to a method set by the user or a predetermined method. For example, the homomorphic ciphertext scheme described above may be the CKKS scheme, the RLWE scheme, or the like.

The ring may be expressed by the following equation.

$$R = Z_q[X]/f(x) \quad \text{[Equation 2]}$$

Here, R indicates the ring, $Z_q$ indicates a coefficient, and f(x) indicates an N-th polynomial.

The Ring indicates a set of polynomials having predetermined coefficients, and indicates a set in which addition and multiplication are defined between elements and which is closed under the addition and multiplication. The Ring may be referred to as the ring.

As an example, the ring indicates a set of the N-th polynomials having the coefficient $Z_q$. In detail, if n is Φ(N), N indicates a polynomial which may be derived as the remainder of dividing the polynomial by an N-th cyclotomic polynomial. (f(x)) indicates ideal of $Z_q[x]$ generated by f(x). The Euler totient function @ (N) indicates the number of natural numbers that are coprime to N and smaller than N.

The ring used in the above-described MLWE may also be expressed by Equation 3 below.

$$R_{q,N}^k = (\mathbb{Z}_q[X]/(X^N + 1))^k \quad \text{[Equation 3]}$$

Here, q indicates a modulus, k indicates a rank, and N indicates a dimension. Meanwhile, the above-described ring assumes MLWE, and in case of using LWE, N may be replaced with 1 and used, and in the RLWE scheme, k may be replaced with 1 and used.

If the ring is set, the processor 120 may derive a secret key sk from the ring.

$$sk \leftarrow (1, s(x)), s(x) \in R \quad \text{[Equation 4]}$$

Here, s(x) indicates a random polynomial generated using a small coefficient.

If the ring and the secret key are selected, the processor 120 may derive a first random polynomial (a(x)) from the ring. The first random polynomial may be expressed as follows.

$$a(x) \leftarrow R \quad \text{[Equation 5]}$$

In addition, the processor 120 may derive the error. In detail, the processor 120 may extract the error from a discrete Gaussian distribution or a distribution having a statistical distance close thereto. This error may be expressed as follows.

$$e(x) \leftarrow D_{\alpha q}^n \quad \text{[Equation 6]}$$

If even the error is derived, a processor 120 may derive a second random polynomial by performing a modular computation on the error in the first random polynomial and the secret key.

$$b(x) = -a(x)s(x) + e(x)(\text{mod } q) \quad \text{[Equation 7]}$$

Finally, a public key pk may be set to include the first random polynomial and the second random polynomial as follows.

$$pk = (b(x), a(x)) \quad \text{[Equation 8]}$$

Meanwhile, each content of Equations 4 to 8 described above may be an example of a case of using the CKKS scheme (i.e., the RLWE scheme), and the above-described scheme may be modified to suit a corresponding scheme and used in case of using the LWE or MLWE scheme. In addition, the public key and the secret key may be generated using a scheme other than the scheme described above.

In addition, the processor 120 may generate the homomorphic ciphertext for the message. In detail, the processor 120 may generate the homomorphic ciphertext by applying the previously-generated public key to the message.

In addition, the processor 120 may perform the partial decryption on the homomorphic computation ciphertext, which is homomorphically computed by the server, by using its own secret key share obtained previously. According to an embodiment, the processor 120 may obtain a final decryption result by combining partial decryption results from the plurality of electronic apparatuses 100-1 to **100-*n***.

Meanwhile, if the electronic apparatus 100 is implemented as the transcryptor, the processor 120 may use a private key to decrypt the homomorphic computation ciphertext received from the server, and broadcast the decrypted homomorphic computation ciphertext to the plurality of electronic apparatuses 100-1 to **100-*n***.

Figure 3:
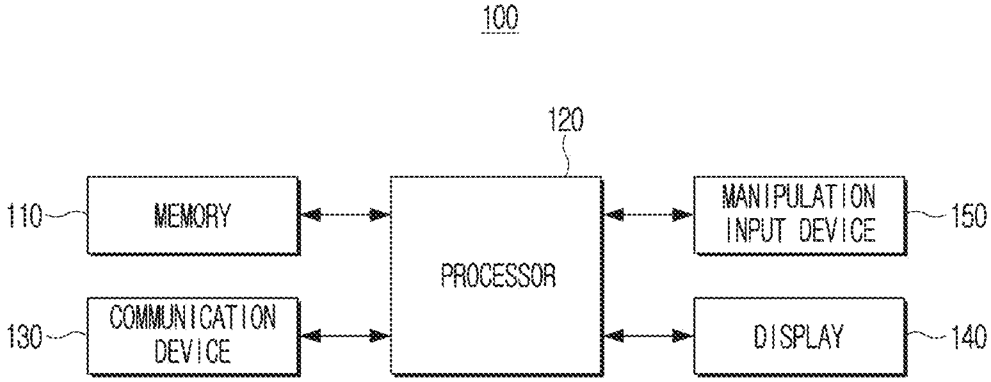
FIG. 3 is a block diagram showing a specific configuration of the electronic apparatus according to an embodiment of the present disclosure.

FIG. 3 is a block diagram showing a specific configuration of the electronic apparatus according to an embodiment of the present disclosure.

Referring to FIG. 3, the electronic apparatus 100 in the present disclosure may include the memory 110, the processor 120, a communication device 130, a display 140, and a manipulation input device 150.

The memory 110 is described with reference to FIG. 2, and the description thus omits a redundant description thereof. In addition, the processor 120 is also described with reference to FIG. 2, and the description only describes its additional functions shown in FIG. 3 instead of providing a redundant description of its content described with reference to FIG. 2.

The communication device 130 may connect the electronic apparatus 100 to the external device (not shown), and may be connected to the external device not only via a local area network (LAN) and the internet, but also via a universal serial bus (USB) port or a wireless communication port (e.g., Wi-Fi 802.11a/b/g/n, NFC, or Bluetooth). The communication device 130 may also be referred to as a transceiver.

The communication device 130 may receive the public key from the external device, and transmit the public key generated by the electronic apparatus 100 to the external device.

In addition, the communication device 130 may receive the message from the external device, and transmit the generated homomorphic ciphertext to the external device. Conversely, the communication device 130 may receive the ciphertext from the external device.

In addition, the communication device 130 may receive various parameters required for generating the ciphertext from the external device. Meanwhile, in implementation, the various parameters may be directly input from the user through the manipulation input device 150 described below.

In addition, the communication device 130 may receive a pre-trained model or a weight matrix included in the above-described model from the external device.

The display 140 may display a user interface window for selection of functions supported by the electronic apparatus 100. In detail, the display 140 may display the user interface window for the selection of various functions provided by the electronic apparatus 100. The display 140 may be a monitor such as a liquid crystal display (LCD), a cathode ray tube (CRT), or an organic light-emitting diode (OLED), and may also be implemented as a touchscreen capable of simultaneously performing a function of the manipulation input device 150 described below.

The display 140 may display the message requesting input of the parameter required for generating the secret key or the public key. In addition, the display 140 may display a message for selecting a message as an encryption target. Meanwhile, in implementation, the encryption target may be selected directly by the user or automatically selected. That is, the personal information or the like that requires the encryption may be set automatically even if the user does not directly select the message.

The manipulation input device 150 may receive a function selection command and a control command for a corresponding function of the electronic apparatus 100 from the user. In detail, the manipulation input device 150 may receive the parameter required for generating the secret key or the public key from the user. In addition, the manipulation input device 150 may receive the message to be encrypted from the user.

In addition, the manipulation input device 150 may receive selection of the trained model to be applied to the plurality of homomorphic ciphertexts. Based on such a selection command, the processor 120 may perform a matrix computation between the weight matrix included in the selected trained model with the plurality of homomorphic ciphertexts.

In addition, the manipulation input device 150 may also receive a transmission command, a homomorphic computation command or the like for the homomorphic ciphertext.

The processor 120 may generate a setting parameter based on the received parameter, and generate the secret key or the public key based on the generated setting parameter if the processor 120 receives the parameters required for generating the secret key or the public key from the user.

In addition, if it is necessary to generate the ciphertext for the message, the processor 120 may apply the public key to the message to thus generate the homomorphic ciphertext. In detail, the processor 120 may transform the message into the polynomial form and apply the public key to the message transformed into the polynomial form to thus generate the homomorphic ciphertext.

In addition, if it is necessary to decrypt the homomorphic ciphertext, the processor 120 may apply the secret key to the homomorphic ciphertext to thus generate the polynomial-format decrypted text, and decode the polynomial-format decrypted text to thus generate the message. The message generated here may include the error as mentioned in Equation 1 described above.

In addition, if it is necessary to perform the computation on the homomorphic ciphertext, the processor 120 may perform the addition or multiplication computation on the plurality of homomorphic ciphertexts requested by the user.

As described above, the electronic apparatus 100 according to this embodiment may generate the homomorphic ciphertext for the message, thus improving the stability of the message even if the computation is required. In addition, the generated homomorphic ciphertext may include the error, thus maintaining stable security for biometric information or the like that requires high security.

Hereinafter, with reference to the drawings, the description describes a method for performing the threshold fully homomorphic encryption enabling the low communication costs. In particular, the description describes the first embodiment according to the present disclosure with reference to FIGS. 4 and 5.

Figure 4:
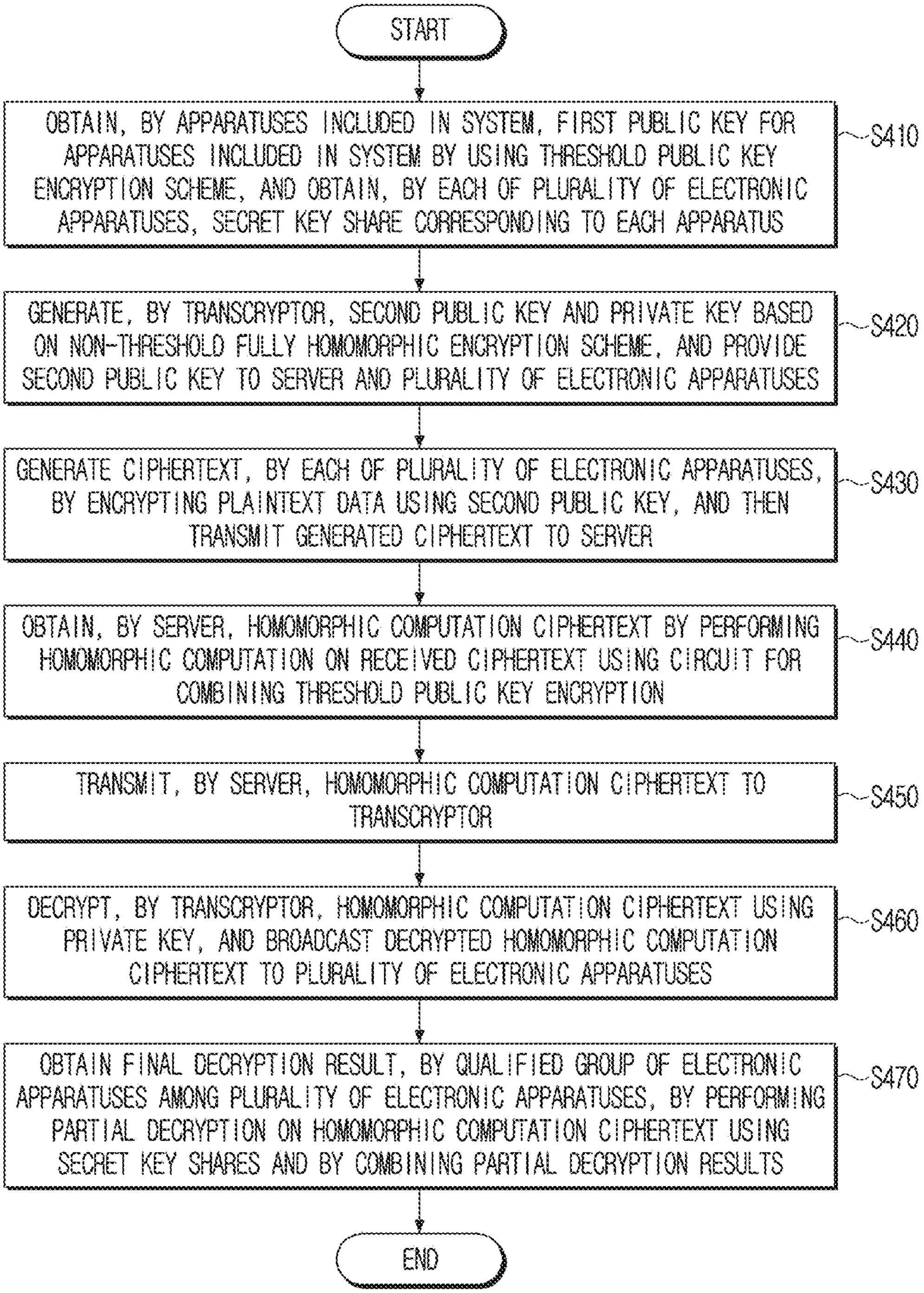
FIG. 4 is a flowchart for describing a control method for the system according to an embodiment of the present disclosure.

FIG. 4 is a flowchart for describing a control method for the system according to an embodiment of the present disclosure. The system according to the present disclosure may include the electronic apparatus, the server, and the transcryptor. Here, the transcryptor may be an intermediate device or electronic apparatus having a private key for the fully homomorphic encryption. In at least one embodiment, the transcryptor may be one of the plurality of electronic apparatuses, which is only an embodiment, and may be a third device. In addition, the plurality of electronic apparatuses may be referred to as “decryptors.”

Referring to FIG. 4, the apparatuses included in the system may obtain a first public key for the apparatuses included in the system by using the threshold public key encryption scheme, and each of the plurality of electronic apparatuses may obtain the secret key share corresponding to each apparatus (S410).

In detail, each device in the system (e.g., each of the plurality of electronic apparatuses, the server, or the transcryptor) may execute a key generation algorithm ThKeyGen for the threshold public key encryption scheme to obtain a shared first public key tpk and private secret key shares $tsk_1$ to $tsk_n$ for the respective apparatuses. Here, the threshold public key encryption scheme may be a public key encryption scheme capable of threshold distributed decryption. In addition, the secret key share may then be used by each device to participate in partial decryption.

The transcryptor may generate a second public key and the private key based on a non-threshold fully homomorphic encryption scheme, and provide the second public key to the server and the plurality of electronic apparatuses (S420).

In detail, the transcryptor may generate a key pair (fpk, fsk) based on the fully homomorphic encryption scheme satisfying non-threshold circuit privacy, and distribute the second public key fpk to the server and the plurality of electronic apparatuses. Here, the private key fsk is not distributed to either the server or the plurality of electronic apparatuses, and may be held only by the transcryptor, and may be used for the fully homomorphic encryption decryption.

Each of the plurality of electronic apparatuses may generate the ciphertext by encrypting the plaintext data using the second public key, and then transmit the generated ciphertext to the server (S430).

In detail, each of the plurality of electronic apparatuses may perform fully homomorphic encryption $\mathrm{FhEnc}_{\mathrm{fpk}}(\mu_i)$ on plaintext data $\mu_i$, each held by the apparatuses themselves, by using the second public key fpk received from the transcryptor, and then transmit the ciphertext $\mathrm{fhct}_i$ to the server.

The server may obtain the homomorphic computation ciphertext by performing the homomorphic computation on the received ciphertext using a circuit for combining the threshold public key encryption (S440).

In detail, the server may perform the homomorphic computations on all the received ciphertexts. In particular, the server may generate a homomorphic computation ciphertext $\mathrm{fhct}_{res}$ by using a circuit referred to as $\mathrm{ThEnc}_{\mathrm{tpk}} \circ C$ to perform fully homomorphic encryption scheme evaluation FhEval. Here, the homomorphic computation ciphertext may be a threshold public key encryption version using the first public key for a result $C(\mu_1, \ldots, \mu_n)$.

The server may transmit the homomorphic computation ciphertext to the transcryptor (S450). Here, the server may transmit the homomorphic computation ciphertext $\mathrm{fhct}_{res}$ calculated in step S440 to the transcryptor. Here, the homomorphic computation ciphertext is encrypted using the fully homomorphic encryption scheme, and accordingly, the server is unable to verify resulting content.

The transcryptor may decrypt the homomorphic computation ciphertext using the private key, and broadcast the decrypted homomorphic computation ciphertext to the plurality of electronic apparatuses (S460).

In detail, the transcryptor may decrypt the homomorphic computation ciphertext $\mathrm{fhct}_{res}$ using the private key fsk to thus obtain a threshold public key ciphertext $\mathrm{tct}_{res} = \mathrm{ThEnc}_{\mathrm{tpk}}(C(\mu_1, \ldots, \mu_n))$, and then broadcast the obtained threshold public key ciphertext to the plurality of electronic apparatuses.

A qualified group of electronic apparatuses among the plurality of electronic apparatuses may obtain the final decryption result by performing the partial decryptions on the homomorphic computation ciphertext using the secret key shares, and combine the partial decryption results (S470).

In detail, the qualified group of apparatuses that satisfy a minimum threshold or higher may generate the partially decrypted value (ThPartDec) for the homomorphic ciphertext $\mathrm{tct}_{res}$ by using their respective secret key shares $\mathrm{tsk}_i$, and combine these values to thus obtain (ThFinDec) the final decryption result $\mu = C(\mu_1, \ldots, \mu_n)$. Here, the qualified group of electronic apparatuses may correspond to a subset of the threshold public key encryption scheme.

To describe the above embodiment in more detail, the embodiment relates to a protocol based on the threshold public key encryption and the (non-threshold) fully homomorphic encryption having circuit privacy.

The protocol is not round-optimal because this protocol requires an additional round to enable the transition from the fully homomorphic encryption to the threshold public key encryption. An entity responsible for the transition may be referred to as the transcryptor. The circuit privacy may be a configuration that allows for a smaller ciphertext although the circuit privacy may be easily obtained using a (exponential) noise-flooding technique.

The protocol may enable a private threshold computation to be performed using a trusted server. However, such a protocol may require an additional round for the decryption, and may require a secure channel for the communication between the electronic apparatus and the server, or between the electronic apparatuses themselves. In addition, the protocol may utilize threshold public key encryption in a black-box manner, and may therefore be extended to an arbitrary access structure as long as the threshold public key scheme supports the access structure. The protocol is not limited to an N-out-of-N scenario, and may also be applied to a T-out-of-N scenario or a more complex scenario.

It may be assumed that the threshold public key encryption scheme is ThPKE=(ThKeyGen, ThEnc, ThPartDec, ThFinDec), and a circuit-private fully homomorphic encryption scheme has a structure FHE=(FhKeyGen, FhEnc, FhEval, FhDec). Assuming that there are N electronic apparatuses (or N users) that want to perform the threshold computation, the N electronic apparatuses may share the secret keys $\mathrm{tsk}_1, \ldots, \mathrm{tsk}_n$ corresponding to the threshold PKE public key tpk. The user or a third party participating in the decryption may be designated as the transcryptor. The transcryptor may generate the key pair (fsk, fpk) for the fully homomorphic encryption and distribute fpk to all the parties (i.e., the plurality of electronic apparatuses and the server). In addition, the communication between the electronic apparatuses or between the electronic apparatus and the server may be established via the secure channel using end-to-end encryption.

Meanwhile, the protocol is described in detail with reference to FIG. 5. However, to simplify the description, FIG. 5 omits an end-to-end encryption layer added on top of all the communications.

A setup step shown in FIG. 5 corresponds to steps S410 and S420 described with reference to FIG. 4, an encrypt data to the server step corresponds to step S430 described with reference to FIG. 4, an evaluation of C over encrypted data step corresponds to step S440 described with reference to FIG. 4, and an encryption step may correspond to steps S450 to S470 described with reference to FIG. 4.

In the present disclosure, it may be assumed that the server and the transcryptor do not collude. The reason is that if the server and the transcryptor collude, the server and the transcryptor may access all data and perform complete decryption. The server may be regarded as a trusted party, may be semi-honest, and may be uncompromised.

Although the protocol does not belong to a conventional threshold fully homomorphic encryption (threshold FHE) scheme, the protocol may enable a private joint computation to be performed by utilizing the trusted server.

The protocol may be simulation-secure. That is, even if up to N−1 electronic apparatuses (also referred to as the parties, selectively including the transcryptor) are compromised, secret data (including the private input and partial decryption key of the electronic apparatus) of the remaining one honest electronic apparatus (that is, the N-th party) may not be revealed to an adversary. As in case of the threshold fully homomorphic encryption, the security property may be modeled by the existence of a simulator. In detail, assuming that $P_N$ is an uncompromised party, there may exist an efficient simulator Sim satisfying the following:

input: calculation result C($\mu_1$, . . . , μ_ℓ) and compromised secret information (tsk$_1$, . . . , tsk_{N−1}, fsk, or the like)

output: tuple (fhct$_{res}$, tct$_{res}$, $p_N$) → The distribution of these tuples is computationally indistinguishable from that in the honest execution of the actual protocol.

Assuming that the threshold public key cryptography ThPKE and the fully homomorphic encryption FHE are correct, the protocol may be correct. Furthermore, assuming that the threshold public key cryptography ThPKE is simulation-secure and the fully homomorphic encryption FHE is circuit-private, the protocol may also be simulation-secure.

The present disclosure may demonstrate the correctness of the protocol, the privacy of user data against the server, and the privacy of data for the compromised users.

First, the correctness of the protocol may immediately follow from the correctness of the underlying fully homomorphic encryption (FHE) scheme and the threshold public key cryptography (ThPKE) scheme.

With respect to the privacy of user data against the server, the server may only observe the FHE ciphertext of the user data. If the user performs communication using the end-to-end encryption during the decryption protocol, the server is unable to learn any other information. In particular, the server is unable to learn the homomorphic computation ciphertext tct$_{res}$, i.e., a result of decrypting the FHE ciphertext calculated by the server. In this case, due to the standard indistinguishability under chosen plaintext attack (IND-CPA) security of the fully homomorphic encryption (FHE) and the security of the end-to-end encryption, the server is unable to learn any information on the user data.

With respect to the privacy of data for the compromised users, it may be assumed that the adversary compromises up to N−1 parties. That is, it may be assumed that the adversary compromises $P_1$ to $P_{N-1}$. Alternatively, the adversary may compromise the transcryptor as well (i.e., the transcryptor may be one of the compromised N−1 parties, or the transcryptor may be a separate third party that is also compromised). An objective of the present disclosure is to ensure the security of the remaining honest party, $P_N$. Assume that the parties $P_1$ to $P_N$ execute a protocol to jointly compute C($\mu_1$, . . . , $\mu_N$), where each $\mu_i$ is an input provided by the party $P_i$ (i∈[N]).

Here, the adversary may observe the following information, which may depend on the private information of PN (such as tsk$_n$ or $\mu_n$):

The homomorphic computation ciphertext fhct$_{res}$ calculated by the server and transmitted to the transcryptor The FHE decryption result tct$_{res}$, which is the result of decrypting the homomorphic computation ciphertext by the transcryptor The partially decrypted value $p_N$ generated by the honest party PN from The FHE decryption result tct$_{res}$ the communication between $p_N$ and the server, which is protected by the end-to-end encryption.

In addition, the adversary is assumed to know the following information:

the public parameter the keys tpk, fpk, fsk, tsk$_1$, . . . , tsk$_{n-1}$

Input values $\mu_1$, . . . , $\mu_{n-1}$

An objective of the present disclosure is to show that the information observed by the adversary (that is, fhct$_{res}$, tct$_{res}$, $p_n$, and the private communication between $p_n$ and the server) may be simulated by the simulator that only knows the calculation result C($\mu_1$, . . . , $\mu_n$).

The present disclosure may define a simple sequence of a hybrid game. The communication between $P_n$ and the server may be protected using the end-to-end encryption, and may therefore be simulated as communication encrypted using all zeros, due to the IND-CPA security. Accordingly, this communication may be ignored, and the analysis may focus only on the information obtained by the adversary (that is, fhct$_{res}$ (the FHE ciphertext), tct$_{res}$ (the FHE decryption result, i.e., the TPKE ciphertext), and $p_n$ (the partial decryption value generated by $P_n$).

1. Hyb$_0$: Honest execution distribution

A first game corresponds to the distribution in the case where the protocol is executed honestly.

2. Hyb$_1$: First hybrid replacing FHE circuit evaluation

Here, instead of the server performing the homomorphic circuit evaluation FhEval to compute fhct$_{res}$←FhEval (ThEnc_tpk°C, fhct$_1$, . . . , fhct$_n$), the server computes the same as follows:

First, tct$_{res}$←ThEnc_tpk(C($\mu_1$, . . . , $\mu_n$) is directly computed, and then the FHE encryption is performed on tct$_{res}$ by using fpk, to thus generate fhct$_{res}$←FhEnc_fpk(tct$_{res}$).

Due to the circuit privacy of the FHE, a distribution between Hyb$_0$ and Hyb$_1$ is statistically indistinguishable.

3. Hyb$_2$: Second Hybrid Using TPKE

Here, a challenger uses the TPKE simulator Sim<sub>ThPKE</sub> to simulate the following:

$$(tctres,\ p_n) \leftarrow Sim_{ThPKE}(tpk,\ tsk_1,\ \ldots\ ,\ tsk_{n-1},\ C(\mu_1,\ \ldots\ ,\ \mu_n)),$$

Then, as before, fhct$_{res}$←FhEnc_fpk(tct$_{res}$) is generated. However, the simulated $p_n$ is provided to the adversary instead of the real $p_n$.

According to a simulation security definition of the ThPKE, a distribution between Hyb$_1$ and Hyb$_2$ is computationally indistinguishable.

The overall distribution generated by the challenger in Hyb$_2$ is sampleable using only the information the adversary knows, which proves that the protocol is simulation-secure.

Meanwhile, the above security analysis is based on the assumption that the transcryptor is compromised. However, if the transcryptor is uncompromised, the situation may be simpler. The reason is that the adversary may access to significantly less information. In particular, in this case, the security may be proven without assuming the circuit privacy, because if the transcryptor is uncompromised, the adversary is unable to observe fhct$_{res}$ and may only learn tct$_{res}$, which is the FHE decryption result. Therefore, in this case, the simulation security of the ThPKE alone may be sufficient to prove the simulation security of the entire protocol. However, the IND-CPA security of the FHE is still necessary to ensure that the server learns nothing about the input data of each party. However, it should be noted that in the absence of the circuit privacy, if the transcryptor decrypts fhct$_{res}$, a decryption error may occur depending on the plaintext, which may lead to the inference of some input information from the party.

Figure 6:
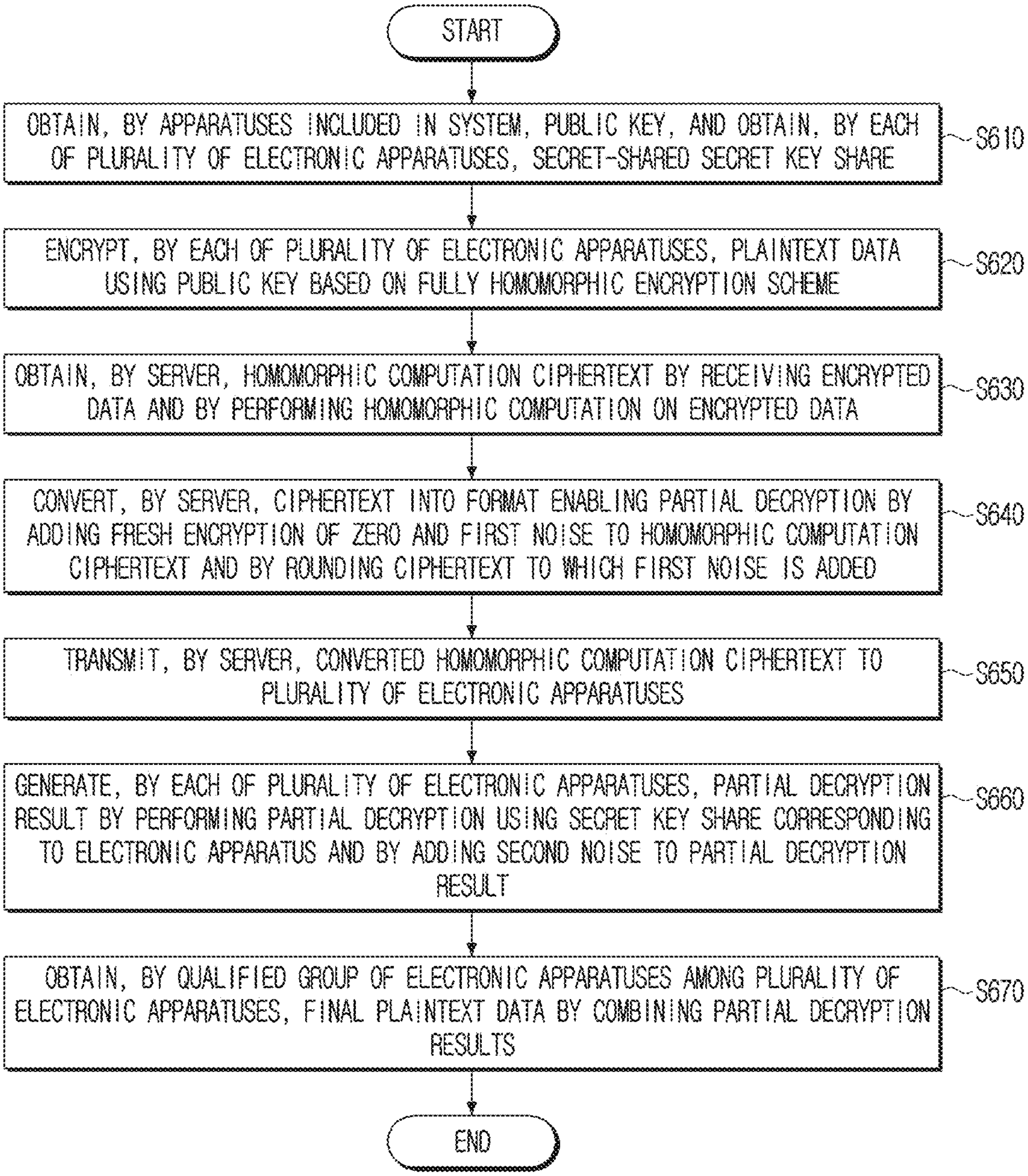
FIG. 6 is a flowchart for describing a control method for the system according to another embodiment of the present disclosure.

A second embodiment of the present disclosure is described with reference to FIGS. 6 to 8. FIG. 6 is a flowchart for describing a control method for a system according to another embodiment of the present disclosure.

The system according to another embodiment of the present disclosure may include the plurality of electronic apparatuses and the server.

Referring to FIG. 6, the apparatuses included in the system may obtain the public key, and the plurality of electronic apparatuses may obtain secret key shares (S610).

In detail, each device in the system (e.g., the plurality of electronic apparatuses and the server) may execute a key generation protocol ThKeyGen(1^λ) of the threshold public key encryption (ThPKE) scheme to obtain the common public key tpk and the respective private secret key shares $tsk_i$. Here, the secret key shares may be distributed across the plurality of electronic apparatuses and may be validly combined only if the plurality of electronic apparatuses jointly participate to perform the final decryption.

Each of the plurality of electronic apparatuses may encrypt the plaintext data by using the public key based on the fully homomorphic encryption (FHE) scheme (S620).

The electronic apparatus may perform the encryption on the plaintext data $\mu_i$ held by the electronic apparatus itself by using the public key fpk of the fully homomorphic encryption (FHE) scheme, as shown in Equation 8.

$$ct_i = FhEnc_{fpk}(\mu_i) \quad \text{[Equation 8]}$$

The FHE used here follows the structure FHE=(FhKeyGen, FhEnc, FhEval, FhDec), and the ciphertext may be represented as a vector over Z_Q. A generated ciphertext $ct_i$ may be transmitted to the server.

The server may obtain the homomorphic computation ciphertext by receiving the encrypted data and by performing the homomorphic computation on the encrypted data (S630).

In detail, for the received ciphertexts $ct_1, \ldots, ct_n$, the server may evaluate a designated computation circuit C by using the Eval function of the FHE scheme, as shown in Equation 9.

$$ct_{res} = FhEval(C, ct_1, \ldots, ct_n) \quad \text{[Equation 9]}$$

As a result, $ct_{res}$ may be a homomorphic computation ciphertext corresponding to a result value $\mu = C(\mu_1, \ldots, \mu_n)$.

The server may convert the ciphertext into a format enabling the partial decryption by adding a fresh encryption of zero and a first noise to the homomorphic computation ciphertext and by rounding the ciphertext to which the first noise is added (S640).

The server may generate fresh encryption of zero $ct_0$ and add first noise e1 sampled from a Gaussian distribution to the homomorphic computation ciphertext, as shown in Equation 10.

$$ct'_{res} = ct_{res} + ct_0 + e_1 \quad \text{[Equation 10]}$$

Here, the circuit privacy may be ensured by adding the first noise.

In addition, the server may round the ciphertext by using a smaller modulus q_{dec}, as shown in Equation 11 below, thereby obtaining a ciphertext ct_dec suitable for the partial decryption.

$$ct_{dec} = \mathrm{Round}_{qdec}(ct'_{res}) \quad \text{[Equation 11]}$$

The server may transmit the converted homomorphic computation ciphertext to the plurality of electronic apparatuses (S650). In detail, the server may broadcast the rounded ciphertext ct_dec generated in step S640 to the plurality of electronic apparatuses.

Each of the plurality of electronic apparatuses may generate the partial decryption result by performing the partial decryption using its own secret key share and by adding a second noise to the partial decryption result (S660).

In detail, each of the plurality of electronic apparatuses $P_i$ may calculate a partial decryption $p_i$ on ct_dec by using its own secret key share $tsk_i$, as shown in Equation 12.

$$p_i = \langle ct_{dec}, tsk_i \rangle \quad \text{[Equation 12]}$$

Next, each of the plurality of electronic apparatuses $P_i$ may add a small second noise e2 (e.g., Gaussian noise) for security purposes, as shown in Equation 13.

$$p'_i = p_i + e_2 \quad \text{[Equation 13]}$$

In addition, a generated partially decrypted value $p'_i$ may be shared for combination.

The qualified group of electronic apparatuses among the plurality of electronic apparatuses may obtain the final plaintext data by combining the partial decryption results (S670).

In detail, the qualified group of apparatuses satisfying the predefined threshold may linearly combine or interpolate their respective $p'_i$ values to restore the final decrypted value u, as shown in Equation 14.

$$\mu = \mathrm{Combine}(p'_1, \ldots, p'_T) \text{ (e.g., via Lagrange interpolation)} \quad \text{[Equation 14]}$$

Finally, μ may correspond to the original plaintext or the homomorphic computation result $C(\mu_1, \ldots, \mu_n)$.

To describe the embodiment described above in more detail, the above embodiment relates to an N-out-of-N threshold fully homomorphic encryption (threshold FHE) scheme having small partial decryption shares.

The design of the scheme proposed in the present disclosure is relatively generic and may be applied to most FHE schemes that support exact computation.

First, a high-level structure of the underlying scheme according to the present disclosure is defined. The description starts with defining the structure.

In the present disclosure, λ is referred to as a security parameter. In addition, the fully homomorphic encryption (FHE) scheme represented as FHE=(FHE.KeyGen, FHE.Enc, FHE.Eval, FHE.Dec) may have the following structure:

1. The public parameters may include the following items:
   - Two dimensions: m≥n≥1
   - Modulus Q≥2
   - Secret key distribution $\chi_s$ over $Z^n$: Sampled vectors using this distribution may have values whose norm is less than or equal to a polynomial size poly(λ)

Three distributions over Z: $\chi_e$, $\chi_v$, and $\chi_f$ (used for error, vector, and noise distributions, respectively).

All these distributions are functions of the security parameter 2 and may be efficiently sampled.

2. The key pair may be structured as follows:
   Public key pk: pk=[A|b], where b:=−A·s+e
   Private key sk: sk=s.

Here, the present disclosure may be configured as follows:

$$A \leftarrow U(\mathbb{Z}_Q^{m\times n}):$$

Sample a matrix A of size m×n from a uniform distribution over Q $$s \leftarrow \chi_s:$$

Sample vector s from the secret key distribution $$e \leftarrow \chi_e^m:$$

Sample error vector e from the distribution $\chi_e$ of dimension m.

Under this configuration, a relation as shown in Equation 15 may hold true.

$$pk\cdot(sk,\ 1)^T = e \bmod Q \quad \text{[Equation 15]}$$

That is, the product of the public key matrix and vector (s,1) may be equivalent to the error vector e modulo Q.

3. A process of encrypting plaintext μ∈M may begin by first encoding μ as follows:
   μ'=$\text{Encode}_q$(μ)∈$Z_Q$ (e.g., multiplying by the scaling factor Δ to set μ'=Δ·μ)
   The encryption may then compute a ciphertext pair ($ct_0$, $ct_1$) as in Equation 16.

$$ct_0 := v^\top A + f^\top,\ ct_1 := v^\top b + f' + \mu' \quad \text{[Equation 16]}$$

Here, $$v \leftarrow \chi_v^m,\ f \leftarrow \chi_f^n \text{ and } f' \leftarrow \chi_f.$$

This structure may support cases where f and f may be zero (e.g., in the FHE scheme ensuring the IND-CPA security using a leftover hash lemma).

Finally, the ciphertext may be structured as shown in Equation 17.

$$ct = (ct_0,\ ct_1) \quad \text{[Equation 17]}$$

This configuration is a typical form of the LWE-based ciphertext structure, forming a basis for FHE computation.

4. The decryption algorithm Dec may be classified into two stages Dec1 and Dec2. The input ciphertext ct may be a fresh ciphertext or the homomorphic computation result.
   (a) Dec1(sk, ct): In a first stage, the calculation may be performed as shown in Equation 18.

$$z := ct_0\cdot sk + ct_1 \bmod Q \quad \text{[Equation 18]}$$

Here, sk indicates the secret key, and $ct_0$ and $ct_i$ indicate components of the ciphertext pair.

(b) Dec2(z): In a second stage, the calculated z may be decoded to restore the decrypted plaintext u.

Here, notably, this stage does not use the private key sk. In some FHE schemes (e.g., the LWE-based CKKS), this stage may be empty or meaningless. In contrast, the exact FHE scheme based on integers may generally perform the rounding or modular reduction computations.

In the present disclosure, the intermediate decryption value z may be assumed to have a form shown in Equation 19.

$$z = \mu' + e_{eval} \quad \text{[Equation 19]}$$

Here, μ'=EncodeQ(μ) is an encoded value of the plaintext data u corresponding to the ciphertext ct, and e_eval indicates an evaluation error having an upper bound defined in Equation 20.

$$ct = R\cdot pk + F + \mu\cdot G \quad \text{[Equation 20]}$$

As mentioned above, one of simple methods for implementing the threshold FHE is as follows. After the decryption, each participant may add an exponential noise term to prevent other users from inferring information on the partial decryption key of each participant. However, a main disadvantage of this noise flooding method is an increased output ciphertext size. The reason is that the modulus size needs to be set sufficiently large to accommodate the addition of large noise during the decryption. To mitigate this issue, the present disclosure proposes a new approach in which exponential noise flooding is performed by the server. The server may perform the computation by using the large modulus Q, and the modulus Q may be set to accommodate the exponential noise flooding. The generated ciphertext may then be rounded to the smaller modulus q_dec (<<Q) and transmitted to the electronic apparatus (or the user). The smaller modulus q_dec may still be large enough to allow each user to add small noise to ensure the security. However, such noise addition does not compromise the decryption accuracy. The electronic apparatus may perform its partial decryption and then re-round the decryption result by using a smaller modulus. At this stage, additional noise is no longer necessary, and the total accumulated noise only needs to be adjusted to avoid compromising the decryption accuracy. As a result, this consecutive rounding procedure may contribute to minimizing bandwidth consumption.

The scheme according to the present disclosure is described with reference to FIGS. 7 and 8. FIG. 7 is a diagram for describing key generation in the double flooding- and round-based threshold fully homomorphic encryption, and may be a diagram for specifying step S610 in FIG. 6. FIG. 8 is a diagram for describing a decryption procedure in the double flooding- and round-based threshold fully homomorphic encryption according to another embodiment of the present disclosure and may be a diagram for describing steps S640 to S660 in FIG. 6.

For simplicity of the description, the scheme of the present disclosure does not include a second rounding performed after the partial decryption. This optimization is described below. This configuration may be based on the perfectly correct fully homomorphic encryption scheme described above. To keep the description concise, the present disclosure may assume a fully homomorphic encryption scheme having the following encoding structure:

A plaintext $\mu \sqcup Z_Q$ may be encoded as EncodeQ(μ), and if the modulus $Q=p \cdot q_{dec}$, a relation as shown in Equation 21 may hold true.

$$\frac{1}{p} \cdot \mathrm{Encode}_Q(\mu) = \mathrm{Encode}_{qdec}(\mu) \quad \text{[Equation 21]}$$

For example, this Equation holds true if the plaintext is encoded in the most significant bits of the ciphertext, which is typically the method used in the BFV scheme (i.e., EncodeQ(μ)=Q/t·u).

The present disclosure describes only KeyGen, ServerDec, PartDec, and FinDec procedures with reference to FIGS. 7 and 8. The reason is that encryption (Enc) and homomorphic computation (Eval) processes are operated identically to the underlying FHE scheme and performed over the large modulus Q.

This scheme may include two noise flooding parameters:

σ_flood: used for the exponential noise flooding by the server (the first noise)

η: used for small flooding during the partial decryption by the user (the second noise).

In addition, two moduli are used:

Q=p·q_dec (the large modulus)

q_dec<<Q (the small modulus used for rounding during the decryption).

Here, in general, $p \approx 2^{\lambda}$ may be set.

According to an embodiment of the present disclosure, the ServerDec process by the server may use randomized Gaussian rounding. In addition, to facilitate the simulation in terms of the security analysis, the public parameter may include a norm ||sk|| of the secret key. However, in practice, it may be safer not to disclose this value, and omitting this value may even enhance the security (because hiding ||sk|| may reduce the amount of information available to the adversary).

After the calculation, the communication between the electronic apparatuses may be limited because the communication is performed only over the small modulus $q_{dec}$: In contrast, before the calculation, i.e., during the process of providing the input data to the server, the encryption may be performed over the modulus $Z_Q$, resulting in large communication volume. This issue may be addressed by utilizing a transciphering technique.

This construction may be further adapted to reduce the bandwidth. For example, the electronic apparatuses may apply the second rounding step after the partial decryption. In detail, the electronic apparatuses may return rounded values, as shown in Expression 22.

$$\left\lfloor \frac{q_{out}}{q_{dec}} \cdot p_i \right\rceil \bmod q_{out} \ \text{(where q\_out < q\_dec)} \quad \text{[Expression 22]}$$

In this way, the size of the partially decrypted values to be shared with other users may be reduced to further lower communication costs.

The security may remain based on an original scheme. This modified scheme may provide less information to the adversary, thereby maintaining the security. Functional correctness may also be maintained, as long as all the parameters are appropriately selected to ensure the decryption accuracy.

Meanwhile, although the embodiments described above address only N-out-of-N threshold profiles, in practice, arbitrary T-out-of-N or more complex threshold access structures may also be supported.

In addition, although step 2 of the FinDec procedure in FIG. 8 describes a simple summation ($\Sigma p_i$), which is merely an embodiment, and is required to be replaced by the linear combination, which may reflect a selected secret sharing scheme.

In addition, although the embodiments described above disclose the LWE-based fully homomorphic encryption, in practice, the RingLWE- and ModuleLWE-based schemes may also be included.

In addition, although steps 6 and 7 of the ServerDec procedure in FIG. 8 use Gaussian rounding, which is merely an embodiment, and other rounding methods may be used.

In addition, although steps 3 of the ServerDec procedure and step 2 of the PartDec procedure, shown in FIG. 8, use Gaussian noise, which is also an embodiment, and an arbitrary noise distribution may be used.

Although the various embodiments have been described above, the respective embodiments may not necessarily be implemented independently and may be entirely or partially combined with at least one other embodiment to be implemented together in a single product.

The various embodiments of the present disclosure may be implemented as software including instructions stored in machine-readable storage media. A machine may be a device that invokes the stored instructions from the storage medium and operates based on the instructions, and may include the electronic apparatuses 100 and 200 according to the disclosed embodiments.

For example, a non-transitory machine-readable storage medium storing software for sequentially performing the various steps described with reference to FIG. 4 or 6 may be provided.

A device equipped with the non-transitory machine-readable medium may perform the operations such as the public key generation, the encryption, and the decryption, as described in the various embodiments provided above.

The term "non-transitory" indicates that the storage medium is tangible without including a signal, and does not distinguish whether data are semi-permanently or temporarily stored on the storage medium.

Alternatively, a program for performing the method according to the various embodiments described above may be distributed online via an application store. In case of the online distribution, at least portions of the computer program product may be at least temporarily stored on a storage medium such as the memory of a server of a manufacturer, a server of an application store or a relay server, or be temporarily generated.

Each of the components (for example, modules or programs) according to the various embodiments may include a single entity or a plurality of entities, and some of the corresponding sub-components described above may be omitted or other sub-components may be further included in the various embodiments. Alternatively or additionally, some of the components (for example, the modules or the programs) may be integrated into the single entity, and may perform functions performed by the respective corresponding components before being integrated in the same or similar manner. Computations performed by the modules, the programs, or other components according to the various embodiments may be executed in a sequential manner, a parallel manner, an iterative manner, or a heuristic manner, at least some of the computations may be performed in a different order or be omitted, or other computations may be added.

Although the present disclosure has been described hereinabove with reference to the accompanying drawings, the scope of the present disclosure is determined based on the claims described below and should not be construed as being limited to the embodiments and/or drawings provided above. In addition, it should be clearly understood that improvements, changes, and modifications apparent to those skilled in the art of the present disclosure described in the claims are also included in the scope of the present disclosure.

DESCRIPTION OF REFERENCE NUMERALS

| | |
|---|---|
| 100: electronic apparatus | 110: memory |
| 120: processor | 130: communication device |
| 140: display | 150: manipulation input device |

The invention claimed is:

1. A control method of a system including a plurality of electronic apparatuses, a transcryptor, and a server, the method comprising:

obtaining, by the apparatuses included in the system, a first public key for the apparatuses included in the system by using a threshold public key encryption scheme, and obtaining, by each of the plurality of electronic apparatuses, a secret key share corresponding to each apparatus;

generating, by the transcryptor, a second public key and a private key based on a non-threshold fully homomorphic encryption scheme, and providing the second public key to the server and the plurality of electronic apparatuses;

generating a ciphertext, by each of the plurality of electronic apparatuses, by encrypting plaintext data using the second public key, and then transmitting the generated ciphertext to the server;

obtaining, by the server, a homomorphic computation ciphertext by performing homomorphic computation on the received ciphertext using a circuit for combining threshold public key encryption;

transmitting, by the server, the homomorphic computation ciphertext to the transcryptor;

decrypting, by the transcryptor, the homomorphic computation ciphertext using the private key, and broadcasting the decrypted homomorphic computation ciphertext to the plurality of electronic apparatuses; and obtaining a final decryption result, by a qualified group of electronic apparatuses among the plurality of electronic apparatuses, by performing partial decryption on the homomorphic computation ciphertext using the secret key shares and by combining the partial decryption results.

2. The method as claimed in claim 1, wherein the qualified group of electronic apparatuses corresponds to a subset of the threshold public key encryption scheme.

3. The method as claimed in claim 1, wherein the transcryptor is one of the plurality of electronic apparatuses or a third party.

4. The method as claimed in claim 1, wherein communication between the server and the plurality of electronic apparatuses or communication between the plurality of electronic apparatuses is protected using end-to-end encryption.

5. The method as claimed in claim 1, wherein the encryption performed by the electronic apparatus is performed using an encryption (Enc) function of the non-threshold fully homomorphic encryption scheme.

6. A control method of a system including a plurality of electronic apparatuses and a server, the method comprising:

obtaining, by the apparatuses included in the system, a public key, and obtaining, by each of the plurality of electronic apparatuses, a secret key share;

encrypting, by each of the plurality of electronic apparatuses, plaintext data using the public key based on a fully homomorphic encryption scheme;

obtaining, by the server, a homomorphic computation ciphertext by receiving the encrypted data and by performing homomorphic computation on the encrypted data;

converting, by the server, the ciphertext into a format enabling partial decryption by adding a fresh encryption of zero and a first noise to the homomorphic computation ciphertext and by rounding the ciphertext to which the first noise is added;

transmitting, by the server, the converted homomorphic computation ciphertext to the plurality of electronic apparatuses;

generating, by each of the plurality of electronic apparatuses, a partial decryption result by performing the partial decryption using the secret key share corresponding to the electronic apparatus and by adding a second noise to the partial decryption result; and obtaining, by a qualified group of electronic apparatuses among the plurality of electronic apparatuses, final plaintext data by combining the partial decryption results.

7. The method as claimed in claim 6, wherein in the converting, the ciphertext is converted by rounding (rescaling) the ciphertext, to which the first noise is added, with respect to a modulus $q_{dec}$ having a first size.

8. The method as claimed in claim 7, wherein the first noise is random Gaussian noise, and each component in the ciphertext is converted using Gaussian rounding with respect to the modulus having the first size.

9. The method as claimed in claim 6, wherein the partial decryption results respectively generated by the plurality of electronic apparatuses are all aggregated and combined with a portion of the ciphertext received from the server, and the final plaintext data is restored from a combined result value.

10. A non-transitory computer-readable medium storing instructions for executing a control method of a system including a plurality of electronic apparatuses, a transcryptor, and a server, wherein the method includes:

obtaining, by the apparatuses included in the system, a first public key for the apparatuses included in the system by using a threshold public key encryption scheme, and obtaining, by each of the plurality of electronic apparatuses, a secret key share corresponding to each apparatus;

generating, by the transcryptor, a second public key and a private key based on a non-threshold fully homomorphic encryption scheme, and providing the second public key to the server and the plurality of electronic apparatuses;

generating a ciphertext, by each of the plurality of electronic apparatuses, by encrypting plaintext data using the second public key, and then transmitting the generated ciphertext to the server;

obtaining, by the server, a homomorphic computation ciphertext by performing homomorphic computation on the received ciphertext using a circuit for combining threshold public key encryption;

transmitting, by the server, the homomorphic computation ciphertext to the transcryptor;

decrypting, by the transcryptor, the homomorphic computation ciphertext using the private key, and broadcasting the decrypted homomorphic computation ciphertext to the plurality of electronic apparatuses; and obtaining a final decryption result, by a qualified group of electronic apparatuses among the plurality of electronic apparatuses, by performing partial decryption on the homomorphic computation ciphertext using the secret key shares and by combining the partial decryption results.

11. A non-transitory computer-readable medium storing instructions for executing a control method of a system including a plurality of electronic apparatuses and a server, wherein the method includes:

obtaining, by the apparatuses included in the system, a public key, and obtaining, by each of the plurality of electronic apparatuses, a secret key share;

encrypting, by each of the plurality of electronic apparatuses, plaintext data using the public key based on a fully homomorphic encryption scheme;

obtaining, by the server, a homomorphic computation ciphertext by receiving the encrypted data and by performing homomorphic computation on the encrypted data;

converting, by the server, the ciphertext into a format enabling partial decryption by adding a fresh encryption of zero and a first noise to the homomorphic computation ciphertext and by rounding the ciphertext to which the first noise is added;

transmitting, by the server, the converted homomorphic computation ciphertext to the plurality of electronic apparatuses;

generating, by each of the plurality of electronic apparatuses, a partial decryption result by performing the partial decryption using the secret key share corresponding to the electronic apparatus and by adding a second noise to the partial decryption result; and obtaining, by a qualified group of electronic apparatuses among the plurality of electronic apparatuses, final plaintext data by combining the partial decryption results.

* * * * *